United States Patent
Chin et al.

(10) Patent No.: US 8,532,025 B2
(45) Date of Patent: Sep. 10, 2013

(54) SIGNALING OVERHEAD REDUCTION METHODS AND SYSTEMS USING SUB-DL-UL-MAP AND HARQ-MAP IN MOBILE WIMAX

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1323 days.

(21) Appl. No.: 12/142,765

(22) Filed: Jun. 19, 2008

(65) Prior Publication Data

US 2009/0197608 A1    Aug. 6, 2009

Related U.S. Application Data

(60) Provisional application No. 61/025,676, filed on Feb. 1, 2008.

(51) Int. Cl.
*H04W 4/00* (2009.01)

(52) U.S. Cl.
USPC ........... 370/328; 370/329; 455/446; 455/450; 455/452.2; 455/453; 455/135; 455/226.1; 455/226.2; 455/226.3

(58) Field of Classification Search
None
See application file for complete search history.

(56) References Cited

U.S. PATENT DOCUMENTS

| | | | |
|---|---|---|---|
| 2003/0002518 A1 | 1/2003 | Shibutani | |
| 2005/0135429 A1 | 6/2005 | Bingham et al. | |
| 2006/0153112 A1* | 7/2006 | Lim et al. | 370/310 |
| 2006/0184854 A1* | 8/2006 | Ihm et al. | 714/749 |
| 2007/0206561 A1* | 9/2007 | Son et al. | 370/346 |
| 2009/0059859 A1 | 3/2009 | Kuze et al. | |
| 2009/0116435 A1* | 5/2009 | Koorapaty et al. | 370/329 |
| 2010/0115369 A1* | 5/2010 | Ihm et al. | 714/749 |

FOREIGN PATENT DOCUMENTS

| | | |
|---|---|---|
| CN | 1929687 A | 3/2007 |
| EP | 1821470 A1 | 8/2007 |
| JP | 2003009223 A | 1/2003 |
| JP | 2007181126 A | 7/2007 |
| RU | 2267863 C2 | 1/2006 |
| WO | WO2006075870 A1 | 7/2006 |
| WO | 2007056107 A2 | 5/2007 |
| WO | 2007100774 A1 | 9/2007 |
| WO | WO2007099839 A1 | 9/2007 |

OTHER PUBLICATIONS

International Search Report & Written Opinion—PCT/US2009/032724, International Search Authority—European Patent Office—May 12, 2009.

(Continued)

*Primary Examiner* — Marsha D Banks Harold
*Assistant Examiner* — Anthony Sol
(74) *Attorney, Agent, or Firm* — Tyler J. Overall

(57) ABSTRACT

Certain embodiments of the present disclosure may allow WiMAX signaling overhead to be reduced by sending burst allocation information to MSs using messages that may be transmitted using more efficient modulation coding schemes (MCSs) than that allowed for DL-MAP and UL-MAP messages. For example, burst allocation information may be sent in SUB-DL-UL-MAP or HARQ-MAP messages that may be encoded with selectable MCSs that result in higher data rate than an MCS used for conventional DL-MAP and UL-MAP messages. For certain embodiments, MSs may be partitioned into groups based on CINR and the burst allocation information for each group may be transmitted using an MCS that is appropriate for that group based on the CINR for MSs in that group.

24 Claims, 10 Drawing Sheets

(56) References Cited

OTHER PUBLICATIONS

Ju Yeop Kim et al: "Piggybacking Scheme of MAP IE for Minimizing MAC Overhead in the IEEE 802.16e OFDMA Systems" Vehicular Technology Conference, 2007. VTC-2007 Fall. 2007 IEEE 66th, IEEE, PI, Sep. 1, 2007, pp. 284-288, XP031147411 ISBN: 978-1-4244-0263-2 abstract p. 284, paragraph II-p. 287, paragraph IV.

WiMAX: "Mobile WiMAX Part 1 A technical overview and performance evaluation" 20060801, [Online] Aug. 1, 2006, pp. 1-53, XP007904771 Retrieved from the Internet: URL:http://www.wimaxforum.org/technology/downloads/Mobi1e_WiMAX_Partl_0ve rvi ew_and_Performance.pdf> [retrieved on May 20, 2008] p. 16, paragraph 2.4-p. 22, paragraph 3.2 p. 36, paragraph 5.3.
Taiwan Search Report—TW098103299—TIPO—Oct. 18, 2012.

* cited by examiner

SIGNALING OVERHEAD REDUCTION METHODS AND SYSTEMS USING SUB-DL-UL-MAP AND HARQ-MAP IN MOBILE WIMAX

CROSS-REFERENCE TO RELATED APPLICATIONS

The present application claims the benefit of priority from U.S. Provisional Patent Application Ser. No. 61/025,676, filed Feb. 1, 2008 and entitled "A signaling overhead reduction method using compressed MAP or HARQ MAP in Mobile WiMAX.," which is fully incorporated herein by reference for all purposes.

TECHNICAL FIELD

Certain embodiments of the present disclosure generally relate to wireless communication and, more particularly, to techniques for reducing signaling overhead.

BACKGROUND

One particular shortcoming of the IEEE 802.16 family of (WiMAX) standards is a large percentage of bandwidth overhead for signaling, such as sending DL-MAP or UL-MAP messages. The signaling overhead is large, at least in part, because the DL-MAP and UL-MAP messages are encoded with a very conservative modulation coding scheme (MCS) in an effort to ensure that these messages are successfully decoded even by the mobile stations (MSs) located the greatest distance from a base station (BS) at cell boundaries.

The DL-MAP message may indicate system configuration parameters and the burst allocation information. The bandwidth inefficiency is especially significant in Voice over IP (VOIP) systems where a large number of users require large sized DL-MAP or UL-MAP messages. This signaling overhead may result in severely limited VOIP air-link capacity.

SUMMARY

For certain embodiments, methods and apparatus for transmitting burst allocation information for N mobile stations in a wireless communications system are provided.

Certain embodiments provide a method for transmitting burst allocation information for N mobile stations in a wireless communications system. The method generally includes partitioning the mobile stations into a plurality of groups, based on reported signal quality values associating a MAP message with each mobile station group, selecting a different modulation coding scheme for each mobile station group, and transmitting burst allocation information for each mobile station group in its associated MAP message transmitted using the selected modulation coding scheme.

Certain embodiments provide a wireless communications device for transmitting burst allocation information for N mobile stations in a wireless communications system. The device generally includes logic for partitioning the mobile stations into a plurality of groups, based on reported signal quality values, logic for associating a MAP message with each mobile station group, logic for selecting a different modulation coding scheme for each mobile station group, and logic for transmitting burst allocation information for each mobile station group in its associated MAP message transmitted using the selected modulation coding scheme.

Certain embodiments provide an apparatus for transmitting burst allocation information for N mobile stations in a wireless communications system. The apparatus generally includes means for partitioning the mobile stations into a plurality of groups, based on reported signal quality values, means for associating a MAP message with each mobile station group, means for selecting a different modulation coding scheme for each mobile station group, and means for transmitting burst allocation information for each mobile station group in its associated MAP message transmitted using the selected modulation coding scheme.

Certain embodiments provide a computer-readable medium containing a program for transmitting burst allocation information for N mobile stations in a wireless communications system. When executed by a processor, the program performs operations generally including partitioning the mobile stations into a plurality of groups, based on reported signal quality values, associating a MAP message with each mobile station group, selecting a different modulation coding scheme for each mobile station group, and transmitting burst allocation information for each mobile station group in its associated MAP message transmitted using the selected modulation coding scheme.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore no to be considered limiting of its scope, for the description may admit to other equally effective embodiments.

DETAILED DESCRIPTION

Figure 1:
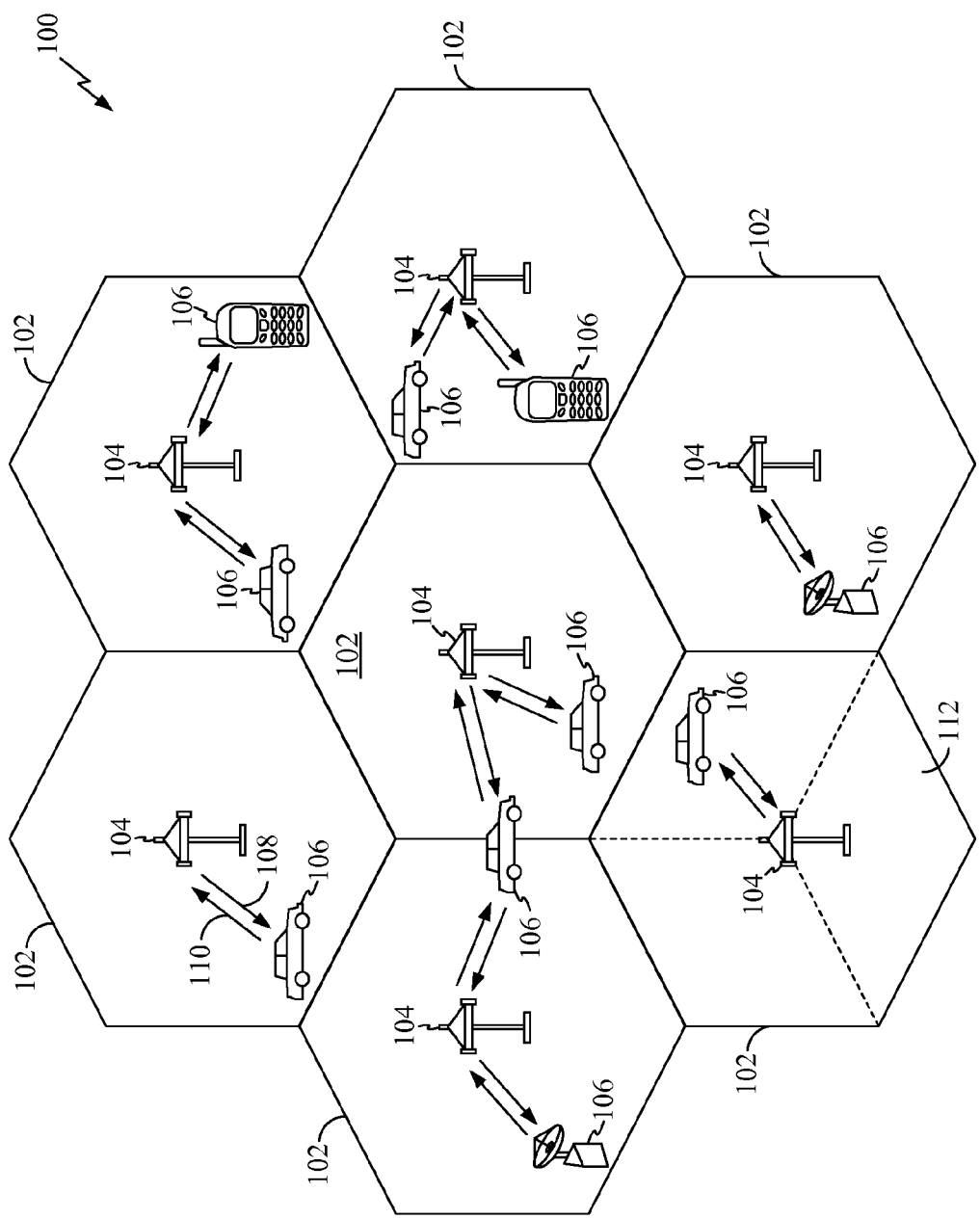
FIG. 1 illustrates an example wireless communication system, in accordance with certain embodiments of the present disclosure.

Embodiments of the present disclosure may allow WiMAX signaling overhead to be reduced by sending burst allocation information to MSs using messages that may be transmitted using more efficient modulation coding schemes (MCSs) than that allowed for DL-MAP and UL-MAP messages. For certain embodiments, MSs may be partitioned into groups based on Carrier to Interface Noise Ratio (CINR) and the burst allocation information for each group may be transmitted using an MCS that is appropriate for that group based on the CINR for MSs in that group.

For certain embodiments, SUB-DL-UL-MAP messages or HARQ-MAP messages may be used for such an alternative data burst allocation method. For example, the bandwidth for MSs with similar CINRs may be allocated by using an appropriate SUB-DL-UL-MAP or HARQ-MAP message. In an effort to optimize burst allocation efficiency, various algorithms for partitioning MSs and choosing an appropriate SUB-DL-UL-MAP or HARQ-MAP message for data burst allocation may be applied. As a result, signaling overhead for sending DL-MAP and UL-MAP messages may be significantly reduced, which may result in corresponding increases in VOIP capacity.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
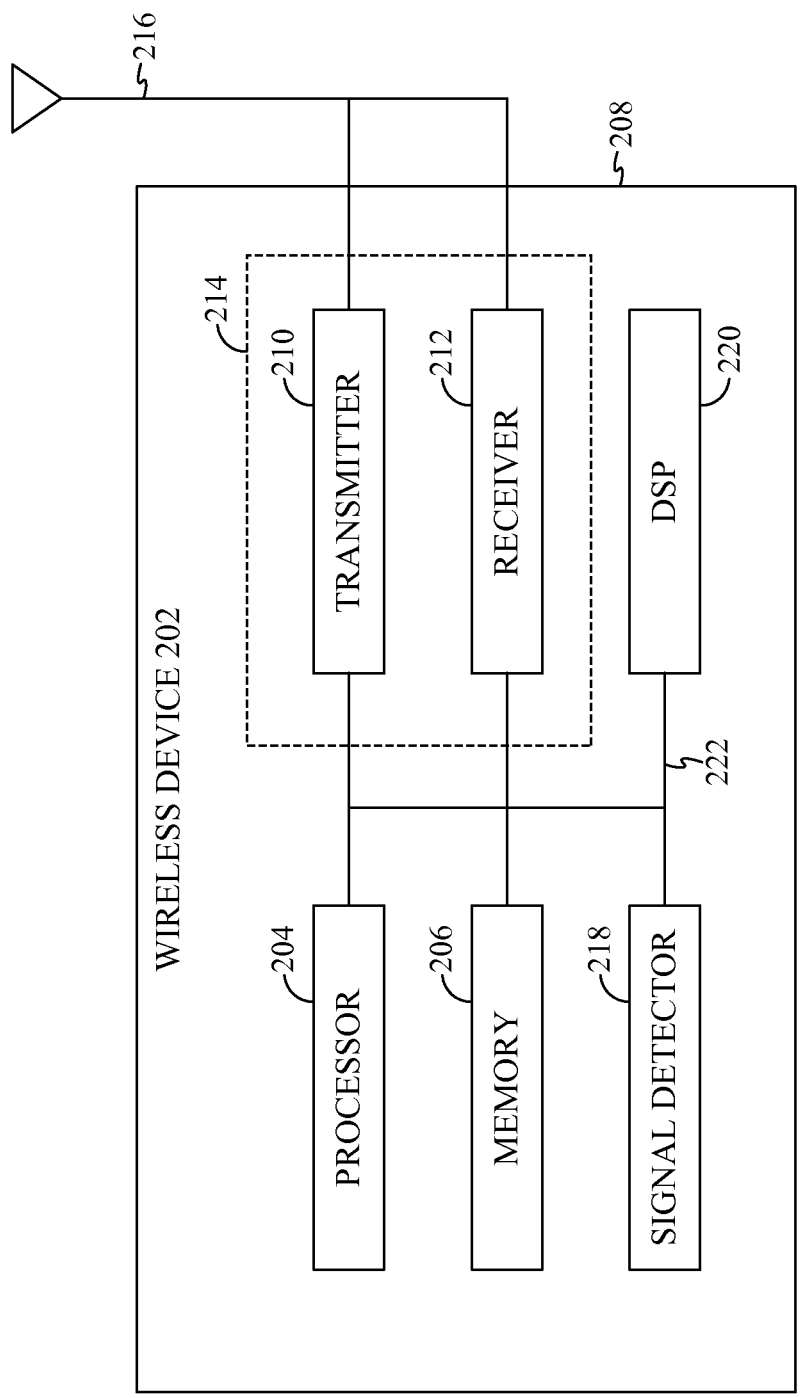
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
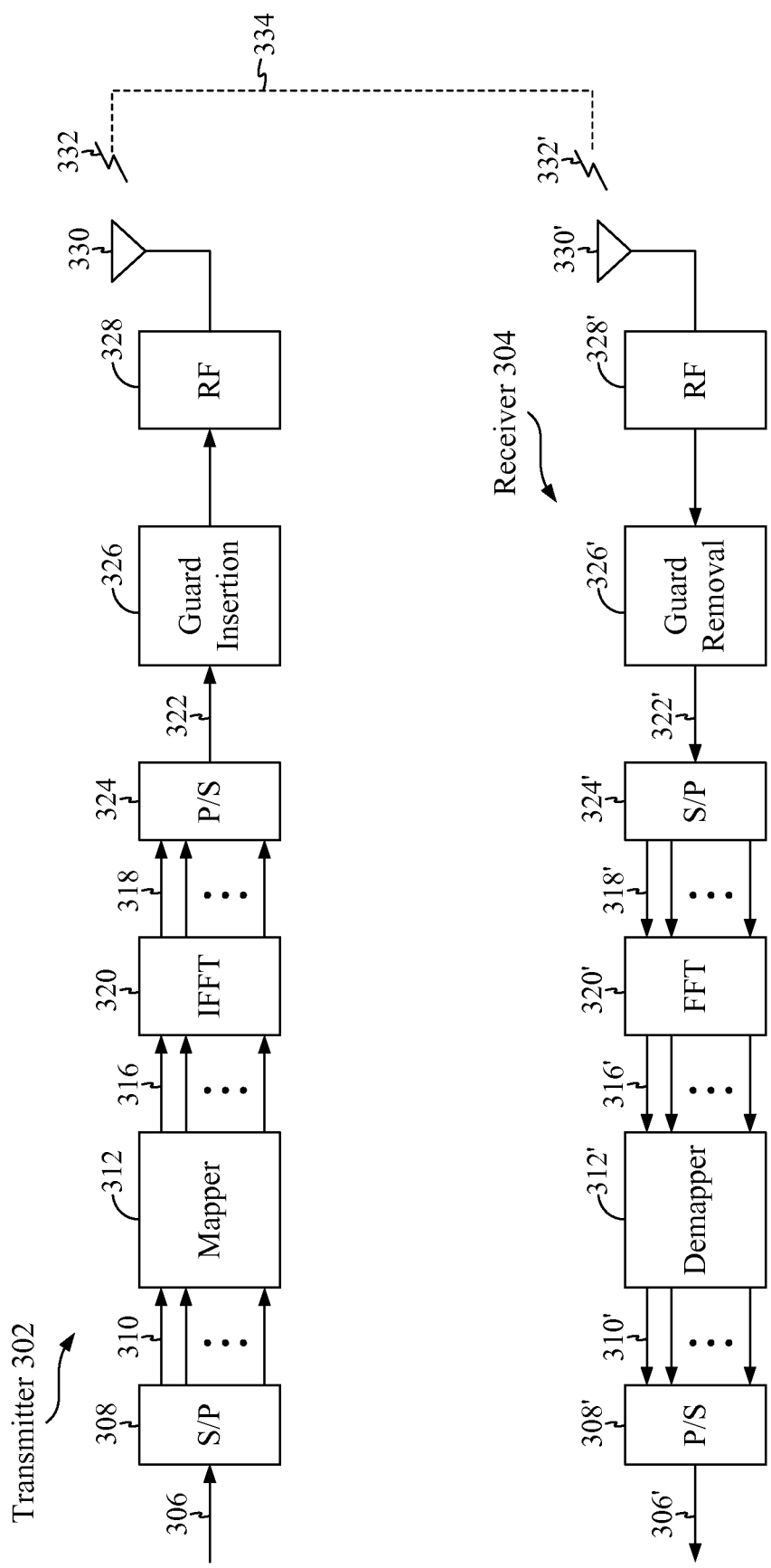
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, $N_s$, is equal to $N_{cp}$ (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302.

Signaling Overhead Reduction Using SUB-DL-UL-MAP Messages

In order to reduce the data bandwidth overhead in sending DL-MAP or UL-MAP messages, the allocation of data bursts can be alternatively achieved by utilizing different types of messages that can be transmitted using more efficient modulation coding schemes (MCSs). As an example, the WiMAX standard supports data burst allocation using SUB-DL-UL-MAP messages that are already transmitted along with the DL-MAP or UL-MAP messages in a frame. By using these alternative messages, data burst allocation information may be transmitted more efficiently, which may effectively reduce the signaling bandwidth overhead in mobile WiMAX systems.

Current versions of the WiMAX standard support up to three SUB-DL-UL-MAP messages per DL frame. These MAP messages may be utilized for data burst allocation instead of using DL MAP or UL MAP messages. For certain embodiments, MSs may be partitioned into different groups each assigned to a different SUB-DL-UL-MAP message based on their reported CINR. Since up to three SUB-DL-UL-MAP messages can be specified per frame, up to three groups of data burst allocations may be defined.

The present disclosure provides a variety of different algorithms that may be utilized to partition the MSs into different groups and to determine which SUB-DL-UL-MAP message may be used to allocate data bursts for each particular MS. As will be described in greater detail below, MS grouping may be performed based on reported CINR, which may also determine the MCS of the data burst that carries the corresponding SUB-DL-UL-MAP message.

Figure 4:
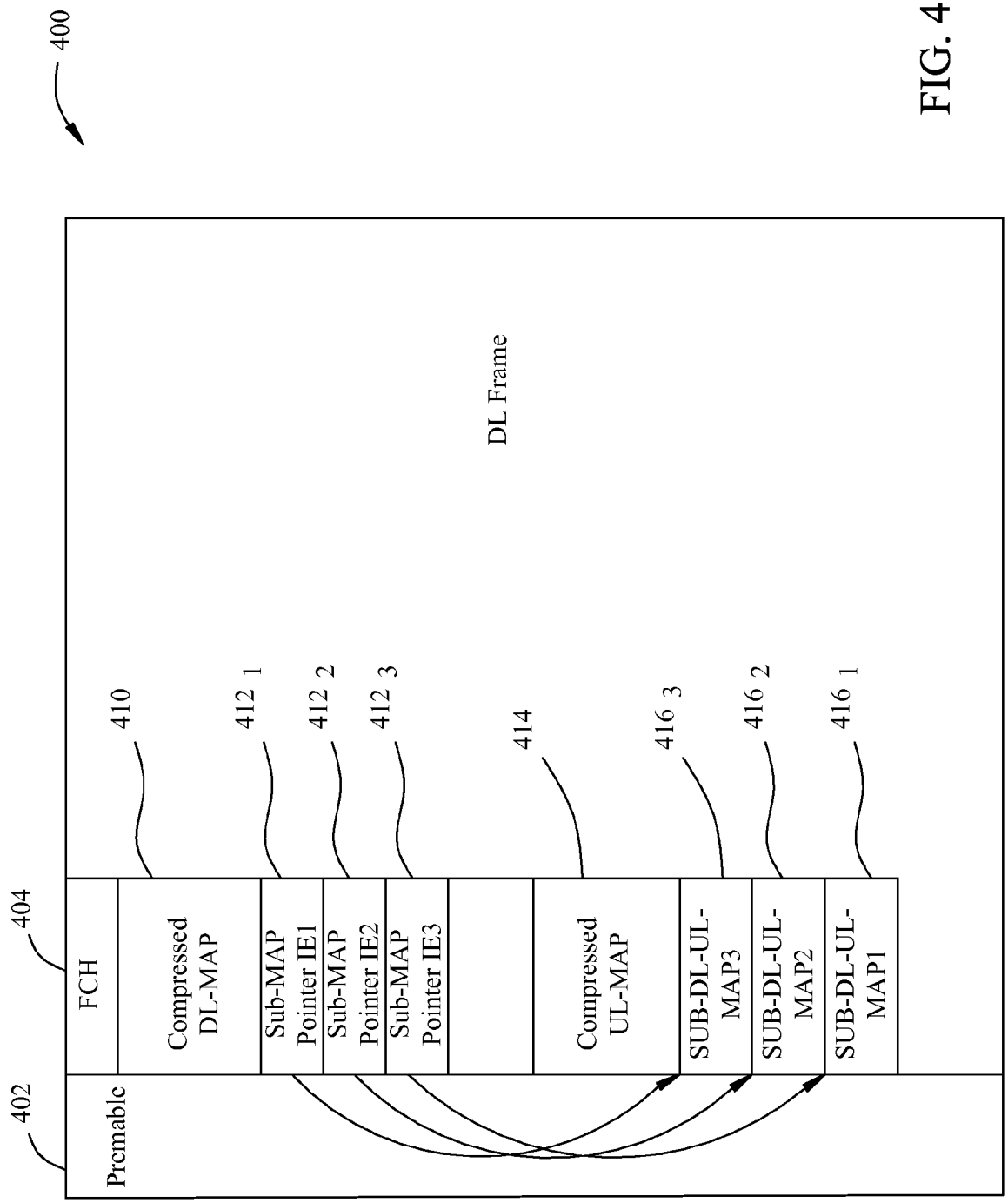
FIG. 4 illustrates a DL frame format with SUB-DL-UL-MAP messages in accordance with certain embodiments of the present disclosure.

FIG. 4 illustrates the structure of an example DL frame 400 with SUB-DL-UL-MAP messages $416_3$, $416_2$ and $416_1$. The DL frame 400 includes preamble 402, frame control header (FCH) segment 404, compressed DL-MAP message 410, compressed UL-MAP message 414, and SUB-MAP pointer IEs $412_1$, $412_2$, $412_3$ for the SUB-DL-UL-MAP messages.

The preamble segment 402 includes a pilot signal used for channel estimation that may be performed at the receiver side. The FCH segment 404 can be used for transmitting both pilot signals and data. The compressed DL-MAP message 410 and the compressed UL-MAP message 414 can be used to allocate the data burst and the broadcast system configuration. The SUB-MAP Pointer IE fields $412_1$, $412_2$, and $412_3$ are associated with the SUB-DL-UL-MAP messages $416_3$, $416_2$, and $416_1$, respectively as illustrated on FIG. 4.

As previously described, in the WiMAX standard, each DL frame may support up to three SUB-DL-UL-MAP messages $416_3$, $416_2$, $416_1$, as illustrated in FIG. 4. The SUB-DL-UL-MAP messages may follow the compressed DL message 410 and the compressed UL MAP message 414. Each SUB-DL-UL-MAP message may allocate both DL and UL data bursts.

The SUB-DL-UL-MAP messages $416_3$, $416_2$, $416_1$, may be contained in different bursts and may be transmitted using different MCSs. The data burst for each SUB-DL-UL-MAP message is allocated by the compressed DL MAP message 410 using the appropriate SUB-MAP Pointer IEs $412_1$, $412_2$, $412_3$.

Figure 5:
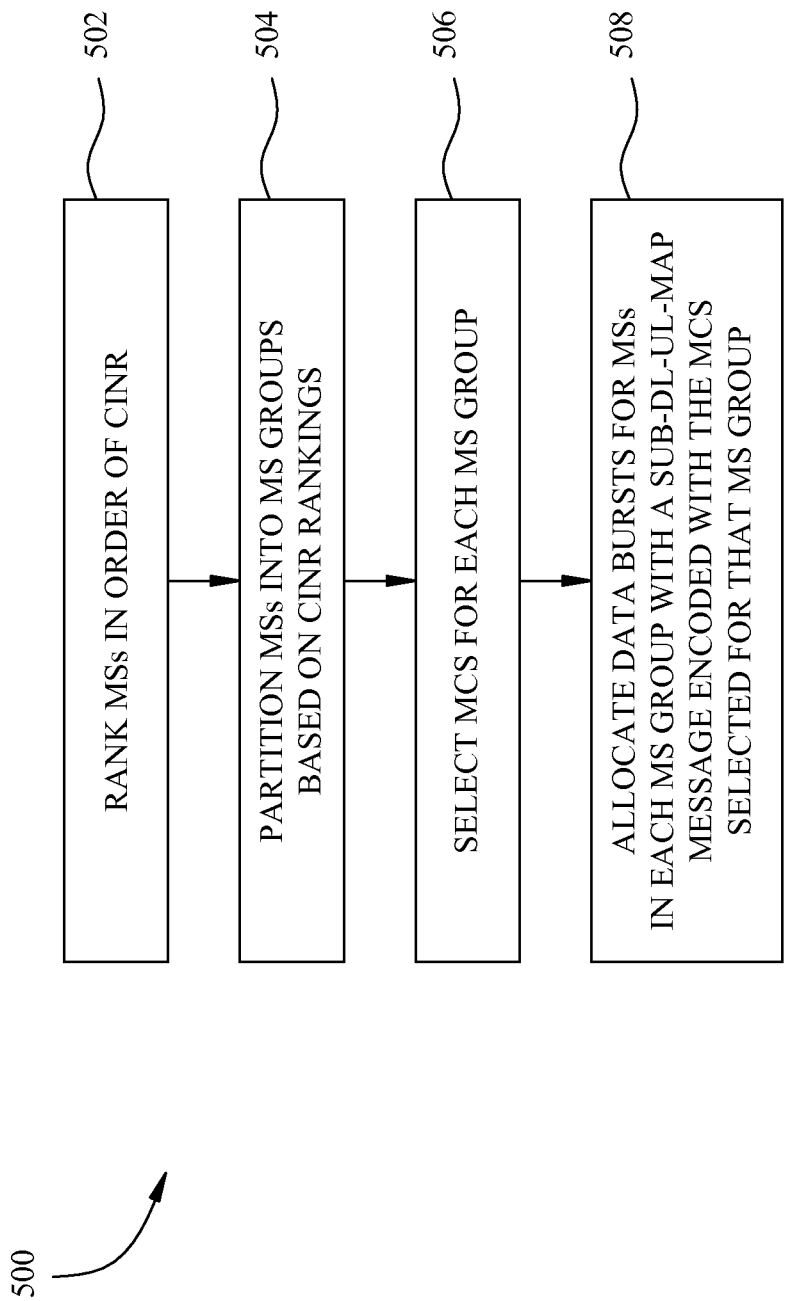
FIG. 5 illustrates example operations for allocating data bursts of MSs with SUB-DL-UL-MAP messages in accordance with certain embodiments of the present disclosure.

FIG. 5 illustrates example operations 500 that may be performed for allocating data bursts for each MS with a SUB-DL-UL-MAP message, in accordance with certain embodiments of the present disclosure. The CINR information of each MS may be utilized as an input to an algorithm for choosing the appropriate MCS and corresponding SUB-DL-UL-MAP message used to allocate the data burst of a particular MS. The CINR information for each MS may be obtained through conventional periodic reporting.

The operations begin, at 502, by ranking MSs in order of their CINRs. For example, the MSs may be ranked in descending order based on their reported CINRs. Assume each MS may be identified with an index k with reported CINR(k), k=1, 2, ..., N, where N is the number of MSs. In such a ranking scheme, the indices can meet the following condition:

$$CINR(i) \geq CINR(j), \text{ if } 1 \leq i \leq j \leq N.$$

At 504, the MSs may be partitioned into groups based on their CINR values. The number of groups may correspond to the number of SUB-DL-UL-MAP messages utilized in the DL frame. For example, if three SUB-DL-UL MAP messages are used there may be three groups of MSs. As will be described in greater detail below, a variety of different algorithms may be used to select the MS groups and corresponding MCS used for the SUB-DL-UL-MAP message.

At 506, an MCS is selected for each group. At 508, the data bursts for the MSs in each group are allocated with a corresponding SUB-DL-UL-MAP message that is encoded with the MCS selected for that group.

As previously mentioned, a variety of different algorithms may be utilized to partition MSs into groups and to select the MCS to be used to encode the corresponding SUB-DL-UL-MAP messages used to allocate the data bursts for the MSs in each group. For certain embodiments, the SUB-DL-UL-MAP messages (SUB-DL-UL-MAP$_m$, where index m=1, 2, 3) may be sent in a particular order based on the type of encoding used. For example, SUB-DL-UL-MAP$_3$ may be sent first, followed by SUB-DL-UL-MAP$_2$, and SUB-DL-UL-MAP$_1$. SUB-DL-UL-MAP$_3$ may be encoded with an MCS having the slowest data rate, as it may be used to allocate the data bursts for the MSs with the worse channel conditions. For example, SUB-DL-UL-MAP$_3$ may be used to allocate data bursts for MSs located at the boundary of the cell, and consequently the strongest MCS may need to be utilized for this group of MSs. SUB-DL-UL-MAP$_1$, on the other hand, may be used to allocate the data bursts for the MSs with the best channel conditions (e.g., MSs closest to a BS) and may, thus be encoded with the weakest MCS and highest data rate.

Three different algorithms will be presented herein as particular, but not limiting examples of how MSs may be grouped with a corresponding SUB-DL-UL-MAP message and the corresponding MCS selected. The example algorithms may be generally referred to as a uniform distribution algorithm, a threshold based distribution algorithm, and an optimal distribution algorithm that attempts to minimize (or at least reduce) the required resources for data transmission.

In the uniform distribution algorithm, the MSs may be partitioned into three sets. Assuming that the MSs have been ranked in order of CINR, with indexes from 1 to N, the MSs may be partitioned into three sets S1-S3 as follows:

$$S_1 = \{1, \ldots, Q\},$$

$$S_2 = \{Q+1, \ldots, 2*Q\}, \text{ and}$$

$$S_3 = \{2*Q+1, \ldots, N\},$$

where Q=CEILING(N/3) and CEILING is the ceiling function. The SUB-DL-UL-MAP message m serves particular MS whose index belongs to the set $S_m$, where m=1, 2, 3.

The MCS used to encode each SUB-DL-UL-MAP message m may be selected to accommodate the MS with the worst signal quality, as indicated by the smallest CINR, for that set $S_m$. If the same MCS is selected for two sets, a single SUB-DL-UL-MAP message may be used instead of two and, consequently, the indexes of the corresponding MSs may be merged.

In the threshold based distribution algorithm, two predetermined CINR threshold values may be utilized ($T_1$ and $T_2$) may be used to partition the MSs into the three sets. For example, the MS indexes may be partitioned into sets ($S_1$, $S_2$, and $S_3$) by comparing their CINR values and the thresholds, such that:

$$S_1 = \{i: CINR(i) \geq T_1, 1 \leq i \leq N\},$$

$$S_2 = \{i: T_1 > CINR(i) \geq T_2, 1 \leq i \leq N\}, \text{ and}$$

$$S_3 = \{i: T_2 > CINR(i), 1 \leq i \leq N\}.$$

Therefore, the SUB-DL-UL-MAP message m may use the MCS that is allowed by the CINR=$T_m$, m=1, 2, namely by the worst CINR in the $m^{th}$ partitioning group. The SUB-DL-UL-MAP message 3 may use the MCS that is allowed by the CINR(N), namely the worst CINR among the third set (and also among all MSs). As described above, if certain set of indexes $S_m$ becomes empty, less than three SUB-DL-MAP messages may be utilized.

The optimal distribution algorithm may be utilized in an effort to group MSs in a manner that conserves overall transmission resources for all groups of MSs. For example, the algorithm may be designed to select the MS groupings and corresponding MCSs that result in transmission of all the allocation information within the fewest resources (e.g., in units of OFDMA slots).

The highest achievable information bit rate corresponding to the CINR(n) value that carries the DL and UL data burst allocation information for n MSs, with indexes 1, 2, ..., n, is R(n,CINR(n)). The information bit rate function R(*) is a link curve when the number of MSs n is fixed. The information bit rate may be determined by the worst CINR, namely CINR(n). In addition, the information bit rate depends on the number of MSs in the group, namely n, because the number of MSs affects the message size. Therefore, the required MCS scheme and achievable information bit rate may be different for the same operating CINR value.

Again assuming N MSs whose DL bursts may be allocated with three SUB-DL-UL-MAP$_m$ messages (m=1, 2, 3), the MSs may be partitioned into three sets S1-S3 defined by non-zero integers X1 and X2, such that:

$$S1 = \{i: 1 \leq i \leq X1\}$$

$$S2 = \{i: X1+1 \leq i \leq X2\}$$

$$S3 = \{i: X2+1 \leq i \leq N\}$$

where S1 has X1 members, S2 has X2-X1 members, and S3 has N-X2 members. In order to optimize transmission efficiency, the actual values for X1 and X2 may be selected as a solution to the following mathematical resource minimization problem:

$$\text{Min } \{X1/R(X1,\text{CINR}(X1))+(X2-X1)/R((X2-X1),\text{CINR}(X2))+(N-X2)/R((N-X2),\text{CINR}(N))\}$$

As described above, the term R(*) indicates an information bit rate that may represent information bits sent per OFDMA slot, or information bit sent per second. Thus, the parameter X/R(*) provides a good metric of resources used to transmit the SUB-DL-UL MAP message for any given set. The higher the information bit rate R(*), the fewer resources used. Conversely, the more users X per set, the larger the message size and the more resources used. Thus, the equation above may be solved by performing an exhaustive search to find a combination of X1 and X2 values that minimizes the total number of slots used to allocate all three groups. For certain embodiments, a less than exhaustive search using a subset of all possible combinations may be performed to expedite calculations.

Figure 6:
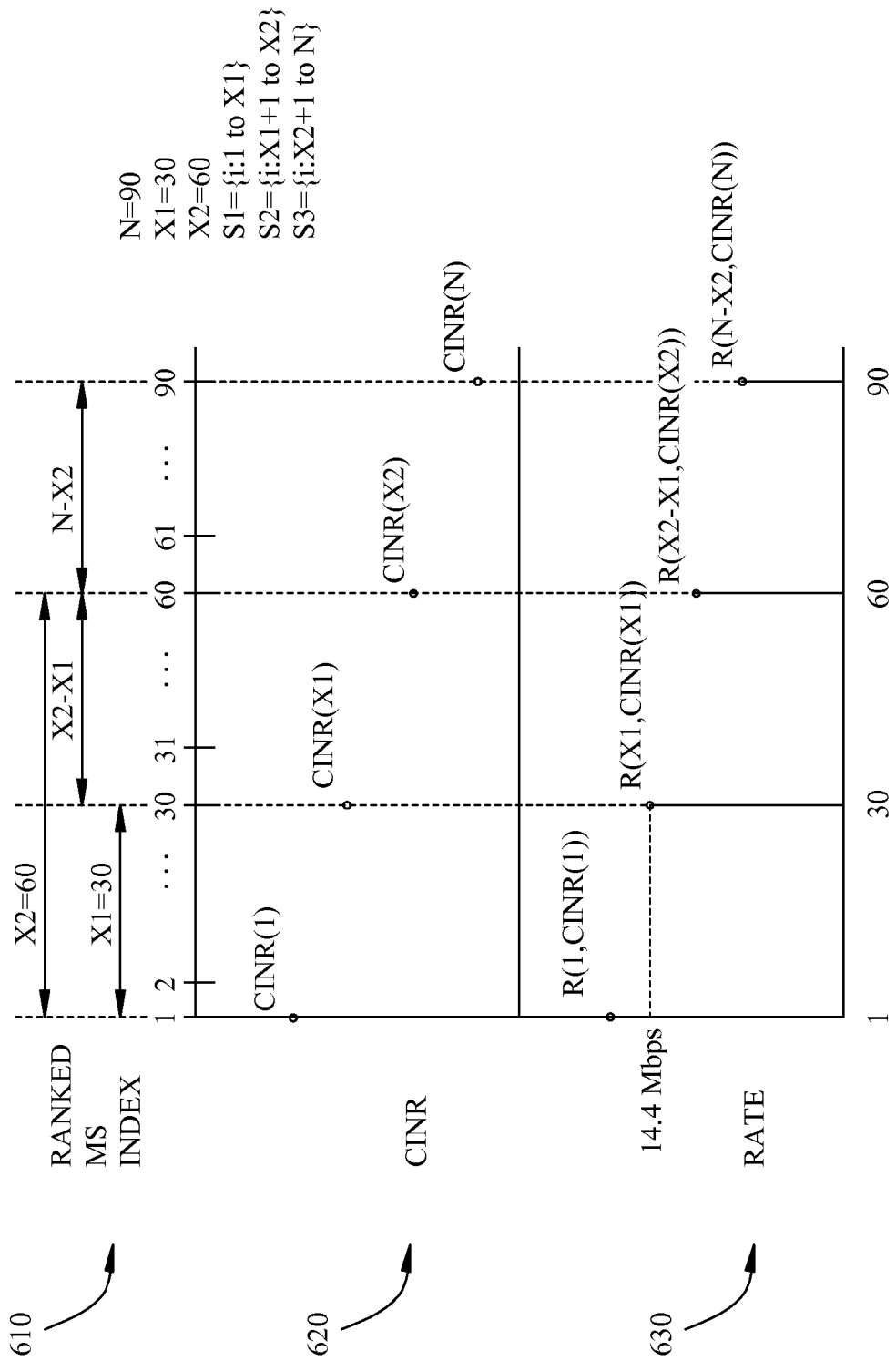
FIG. 6 illustrates a distribution algorithm for partitioning MSs across SUB-DL-UL-MAP messages and for selecting corresponding MCSs in accordance with certain embodiments of the present disclosure.

The calculations for one possible combination of X1 and X2 values may be described with reference to the example illustrated in FIG. 6. The partitioning of N MSs in each burst group is presented in the diagram 610. The illustrated example assumes 90 MSs (N=90), and initial values of 30 and 60 for X1 and X2, respectively, such that each set S1-S3 has 30 MSs (S1=1 to 30, S2=31 to 60, and S3=61 to 90). It is also assumed that the MSs have already been ranked in order by CINR, such that $MS_1$ has the highest CINR value, while $MS_{90}$ has the lowest CINR value, as illustrated in the diagram 620.

As illustrated by the diagram 630, the information bit rate R(*) for each group depends on the worst channel quality of the users in the group and number of users in the group. In other words, for the first group, with X1 users:

$$R(*)=R(X1,\text{CINR}(X1))$$

In the illustrated example, X1=30 and X2=60, so the $30^{th}$ user has the worst channel quality in the first group, the $60^{th}$ user has the worst channel quality in the second group, and the $90^{th}$ user has the worst channel quality in the third group.

In the illustrated example, the worst CINR for the first group, CINR(30), corresponds to an example information bit rate of 14.4 Mbps. Assuming that there are 200 frames per seconds, each frame with 500 slots, there would be 0.1 Mega slots per second (200*500=0.1 Mega). Therefore, the number of information bits that can be sent per slot (b) is:

$$b=14.4 \text{ Mbps}/0.1 \text{ M slots/sec}=144 \text{ bits per slot.}$$

Assuming 48 data subcarriers per slot, 3 bits (144/48) may be sent per subcarrier. An appropriate modulation coding scheme (MCS) for these parameters may be, for example, be 64 QAM and ½ CTC (Convolutional Turbo Code). While 64 QAM can send 6 data bits per subcarrier, the ½ CTC may reduce the information bits per subcarrier to 6*½=3.

As previously described, $SUB-DL-UL-MAP_1$ may be used to allocate bursts for users close to the base station (Group S1), contributing to the resource metric X1/R(X1,CINR(X1)) in the equation to be minimized above. As an example calculation of this metric, there may be 96 bits of data burst allocation information per user in a SUB-DL-UL-MAP. Thus, in the illustrated example with 30 users, there would be a total of 2880 bits (96 bits/user*30 users) to be sent to the first group of users. Therefore, the resources needed (in units of OFDMA slots) for the first group in the SUB-MAP message is:

$$2880 \text{ bits}/144 \text{ bits/slot}=20 \text{ slots.}$$

A similar calculation may be made for the resource requirements of the remaining groups (S2 and S3) for the combination of X1 and X2 values being considered. The total resource requirements may then be stored and this process may be repeated for all the other combinations of values under consideration. The combination of values that results in the minimum total resource requirement for transmitting the burst allocation for all MSs may then be used for partitioning the MSs and the corresponding MCS selection.

One advantage of this optimum solution algorithm is that the resulting selections of X1 and X2 values should not vary with different operating parameters, meaning the algorithm may be used in a wide range of operating conditions. For example, while the total amount of resources required may change as various conditions change, such as the number of bits of SUB-DL-UL-MAP per user, number of frames per second, slots per frame, and number of data subcarriers per slot, the optimal choice of X1 and X2 values should not be affected. This is apparent from the inclusion of X1 and X2 values in the nominators of the formula, while the R(*) metric can be in units of information bits per slot or information bits per second.

Signaling Overhead Reduction Method Using HARQ MAP in Mobile WiMAX

In order to reduce the data bandwidth overhead in sending DL-MAP or UL-MAP messages, the allocation of data bursts may be achieved by utilizing HARQ-MAP messages that are already transmitted along with the DL-MAP or UL-MAP messages in the frame. By allocating burst information with the HARQ-MAP messages which may be encoded with different selected MCSs, rather than allocating all bursts with the conservatively encoded regular DL-MAP or UL-MAP messages, system resources may be conserved. HARQ-MAP messages may be used as an alternative to, or in addition to, using SUB-DL-UL-MAP messages for allocating data bursts.

WiMAX standards (IEEE 802.16 family) support up to four HARQ-MAP messages per DL frame that may be utilized to allocate data bursts for all MSs in the system. Each HARQ-MAP message may be used to allocate the bandwidth for MSs that are characterized with similar CINR values, and the grouping of MSs with a particular HARQ-MAP message may be accomplished in a similar manner as described above with reference to using SUB-DL-UL-MAP messages for data burst allocation.

Figure 7:
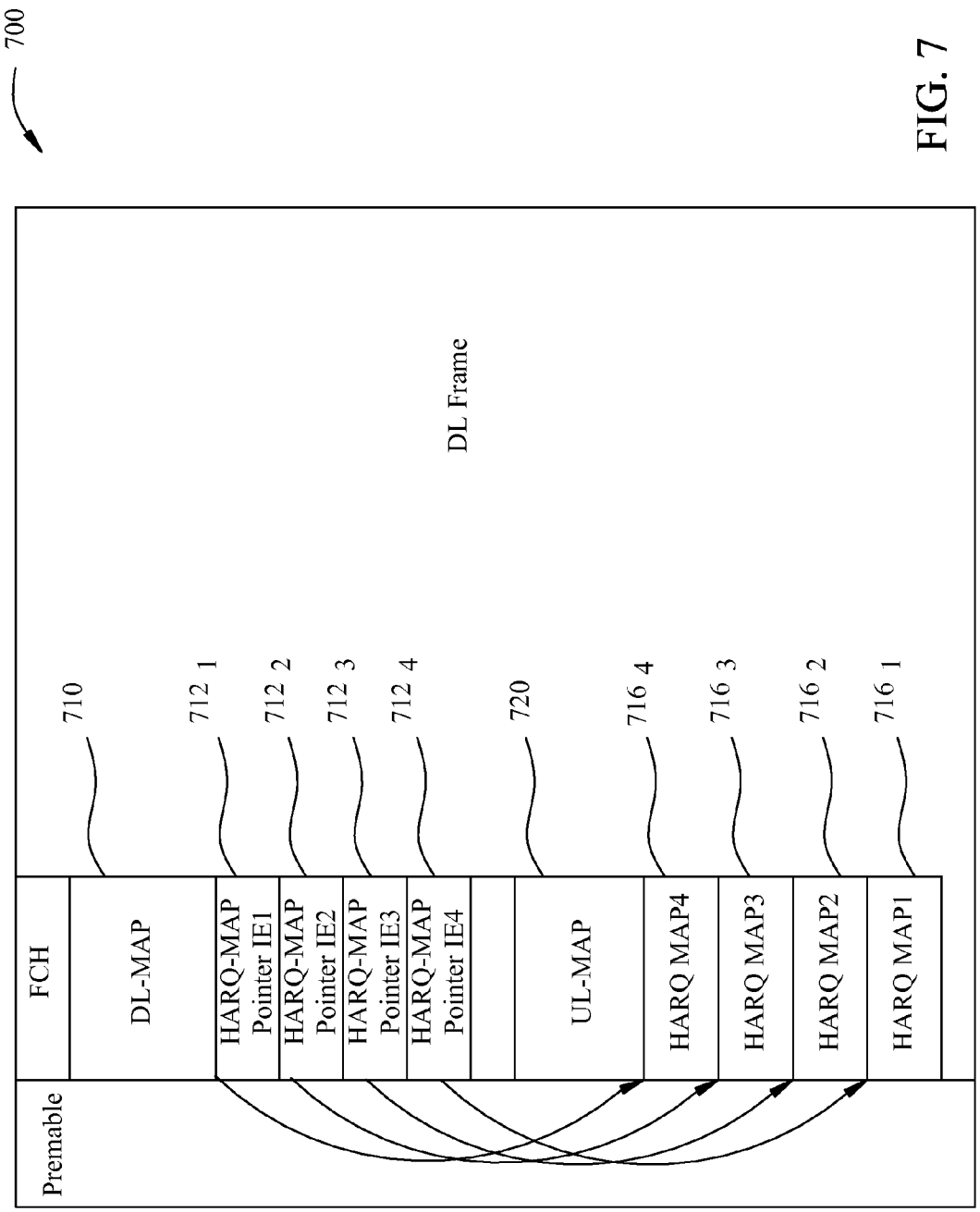
FIG. 7 illustrates an example DL frame format with HARQ-MAP messages in accordance with certain embodiments of the present disclosure.

FIG. 7 illustrates an example DL frame format 700 with four HARQ-MAP messages $716_4$, $716_3$, $716_2$, $716_1$. As illustrated, the HARQ-MAP messages may follow the DL-MAP 710 and UL-MAP 720 and may be allocated with HARQ MAP Pointer IEs $712_1$, $712_2$, $712_3$, $712_4$ contained in the regular DL-MAP 710.

As described above with reference to the SUB-DL-UL-MAP messages, the data bursts containing the HARQ-MAP messages may be transmitted with different MCS. Besides allocating both DL and UL data bursts, each HARQ-MAP message may also specify the HARQ control information (i.e., the subpacket ID and the HARQ channel ID), the CQICH information for fast channel feedback allocation, and the ACK control information for the HARQ ACK channel.

Figure 8:
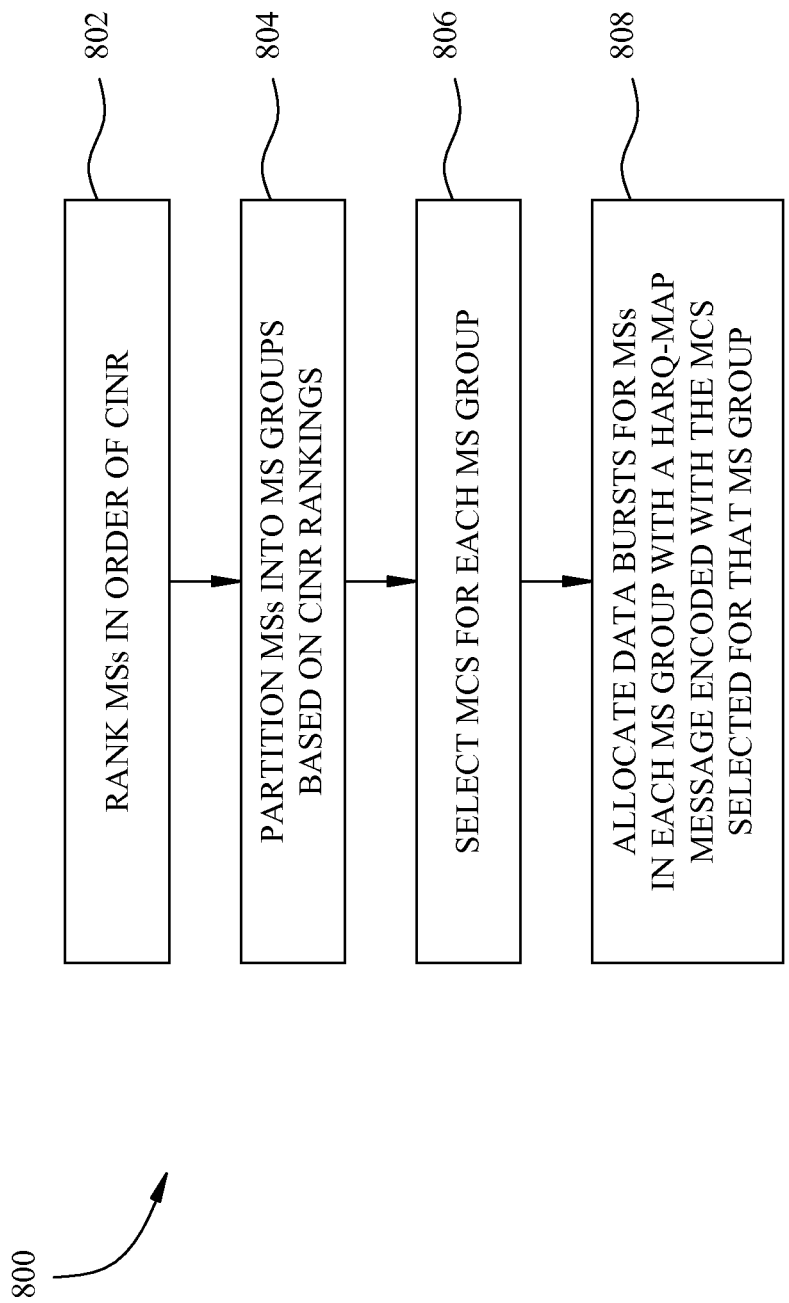
FIG. 8 illustrates example operations for allocating data bursts of the MSs with HARQ-MAP messages in accordance with certain embodiments of the present disclosure.

FIG. 8 illustrates example operations 800 that may be performed for allocating data bursts for each MS with HARQ-MAP messages, in accordance with certain embodiments of the present disclosure. The operations begin, at 802, by ranking MSs in order of their CINR values, for example, in descending order as described above.

At 804, the MSs may be partitioned into groups based on their CINR value and, at 806, and MCS is selected for each group. At 808, the data burst for the MSs in each group are allocated with the corresponding HARQ-MAP message sent using the MCS selected for the group. The number of groups may correspond to the number of HARQ-MAP messages utilized in the DL frame, although less than that number may be used depending on the CINR values. As described above, a variety of different algorithms may be used to select the MS groups and corresponding MCS used to send the HARQ-MAP messages, including those described above with reference to sending burst allocation information in SUB-DL-UL MAP messages.

Previously proposed algorithms for determining which SUB-DL-UL-MAP message will allocate the data burst information for a particular group of MSs and for selecting a corresponding MCS may be readily applied for determining which HARQ-MAP message will allocate the data burst information for a particular group of MSs. Application of the algorithms may be adapted, however, to account for the difference in number of available HARQ-MAP messages: up to four HARQ-MAP messages may be sent inside the frame instead of up to three SUB-DL-UL-MAP messages.

The previously proposed uniform distribution algorithm, the threshold based distribution algorithm and the optimal distribution algorithm may still be applied, but using four sets of MS indexes rather than three. For example, for the uniform distribution algorithm, the MSs may be partitioned into four sets, $S_1$-$S_4$, where HARQ MAP message m serves MSs with index set Sm, m=1, 2, 3, 4. Similarly, for the threshold based distribution algorithm, three threshold values (T1, T2 and T3) may be used for CINR comparisons to partition the MSs into four sets. For the optimal distribution algorithm, the resource minimization problem may be solved for three values (X1, X2 and X3) that separate N MSs into four separate groups.

Figure 5A:
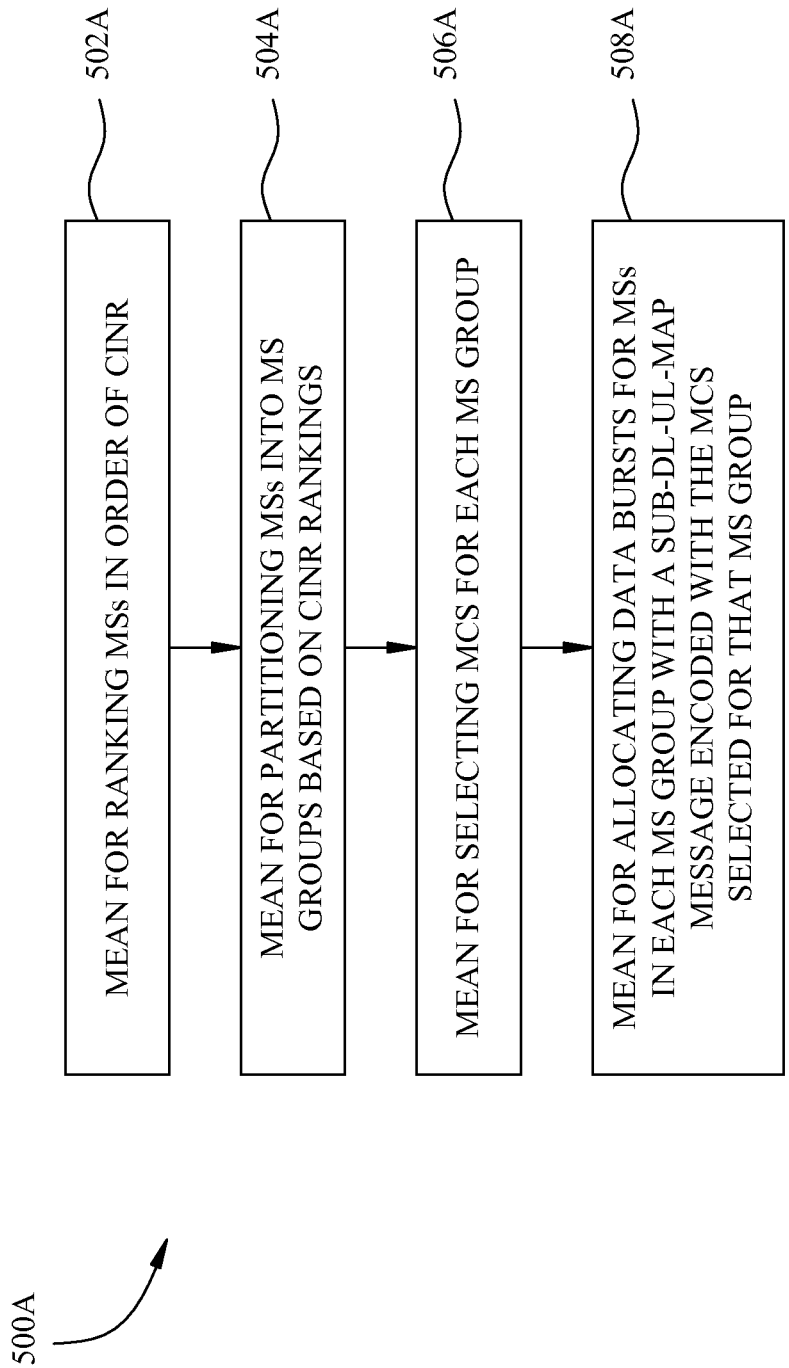
FIG. 5A illustrates example components capable of performing the operations illustrated in FIG. 5.
Figure 8A:
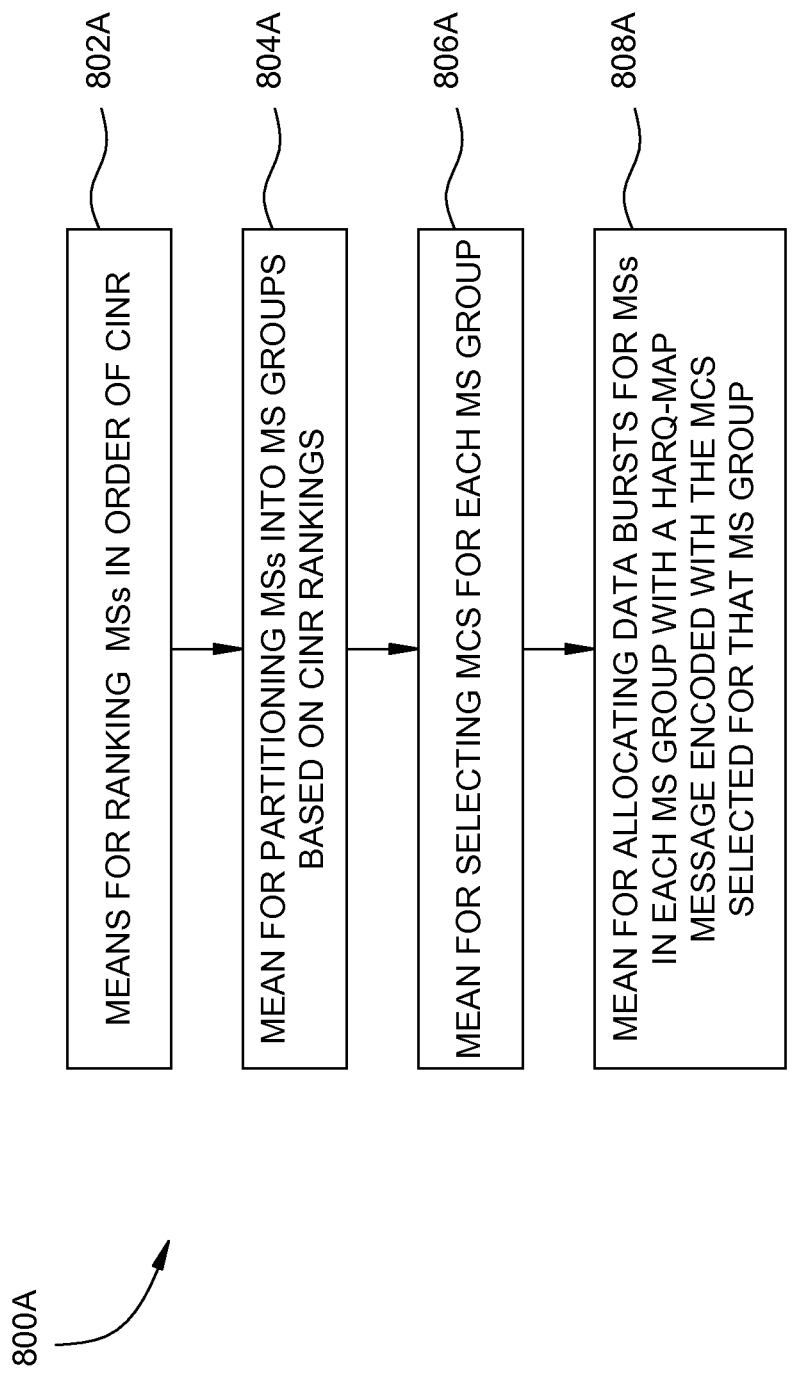
FIG. 8A illustrates example components capable of performing the operations illustrated in FIG. 8.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-508 illustrated in FIG. 5 correspond to means-plus-function blocks 502A-508A illustrated in FIG. 5A. Blocks 802-808 illustrated in FIG. 8 correspond to means-plus-function blocks 802A-808A illustrated in FIG. 8A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions of as one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for transmitting burst allocation information for N mobile stations in a wireless communications system, comprising:
   partitioning the mobile stations into a plurality of mobile station groups, based on reported signal quality values, wherein the reported signal quality values comprise Carrier to Interface Noise Ratio (CINR) values, wherein partitioning the mobile stations into the mobile station groups comprises ranking the mobile stations in order of their CINR value, and wherein partitioning the mobile stations into the mobile station groups further comprises:
      selecting multiple combinations of sizes for the mobile station groups;
      evaluating each combination of sizes by calculating a resource metric indicative of total resources used to transmit burst allocation information for each mobile station group based on the combination of sizes under evaluation; and
      selecting a combination of sizes for the mobile station groups based on the evaluations;
   associating a MAP message with each mobile station group;
   selecting a different modulation coding scheme for each mobile station group; and
   transmitting burst allocation information for each mobile station group in its associated MAP message transmitted using the selected modulation coding scheme.

2. The method of claim 1, wherein associating a MAP message with each mobile station group comprises associating a SUB-DL-UL-MAP message to each group.

3. The method of claim 1, wherein associating a MAP message with each mobile station group comprises associating a HARQ-MAP message to each group.

4. The method of claim 1, wherein:
   associating a MAP message with each mobile station group comprises associating a MAP message of a first type to each mobile station group; and
   partitioning the mobile stations into a plurality of groups comprises partitioning the mobile stations into a fewer number of groups than there are MAP messages of the first type available in an OFDMA frame.

5. The method of claim 1, wherein selecting a combination of sizes based on the evaluations comprises selecting a combination of sizes that minimizes the resource metric.

6. The method of claim 1, wherein:
   the mobile stations support OFDMA communications in accordance with one or more standards of the Institute of Electrical and Electronics Engineers (IEEE) 802.16 family of standards; and
   transmitting burst allocation information for each mobile station group comprises transmitting burst allocation in a MAP message transmitted in accordance with one or more standards of the IEEE 802.16 family of standards.

7. A wireless communications device for transmitting burst allocation information for N mobile stations in a wireless communications system, comprising:
   a processor;
   memory in communication with the processor; and
   instructions stored in the memory and executable by the processor to:
      partition the mobile stations into a plurality of mobile station groups, based on reported signal quality values, wherein the reported signal quality values comprise Carrier to Interface Noise Ratio (CINR) values, wherein partitioning the mobile stations into the mobile station groups comprises ranking the mobile stations in order of their CINR value, and wherein partitioning the mobile stations into the mobile station groups further comprises:
         selecting multiple combinations of sizes for the mobile station groups;
         evaluating each combination of sizes by calculating a resource metric indicative of total resources used to transmit burst allocation information for each mobile station group based on the combination of sizes under evaluation; and
         selecting a combination of sizes based on the evaluations;
      associate a MAP message with each mobile station group;
      select a different modulation coding scheme for each mobile station group; and
      transmit burst allocation information for each mobile station group in its associated MAP message transmitted using the selected modulation coding scheme.

8. The device of claim 7, wherein the instructions are executable by the processor to associate a SUB-DL-UL-MAP message to each group.

9. The device of claim 7, wherein instructions are executable by the processor to associate a HARQ-MAP message to each group.

10. The device of claim 7, wherein the instructions are executable by the processor to:
    associate a MAP message with each mobile station group is configured to associate a MAP message of a first type to each mobile station group; and
    partition the mobile stations into a plurality of groups is configured to partition the mobile stations into a fewer number of groups than there are MAP messages of the first type available in an OFDMA frame.

11. The device of claim 7, wherein instructions are executable by the processor to select a combination of sizes that minimizes the resource metric.

12. The device of claim 7, wherein:
    the mobile stations support OFDMA communications in accordance with one or more standards of the Institute of Electrical and Electronics Engineers (IEEE) 802.16 family of standards; and
    the instructions are executable by the processor to transmit burst allocation in a MAP message transmitted in accordance with one or more standards of the IEEE 802.16 family of standards.

13. An apparatus for transmitting burst allocation information for N mobile stations in a wireless communications system, comprising:
    means for partitioning the mobile stations into a plurality of mobile station groups, based on reported signal quality values, wherein the reported signal quality values comprise Carrier to Interface Noise Ratio (CINR) values, wherein partitioning the mobile stations into the mobile station groups comprises ranking the mobile stations in order of their CINR value, and wherein partitioning the mobile stations into the mobile station groups further comprises:
       selecting multiple combinations of sizes for the mobile station groups;
       evaluating each combination of sizes by calculating a resource metric indicative of total resources used to transmit burst allocation information for each mobile station group based on the combination of sizes under evaluation; and selecting a combination of sizes based on the evaluations;

means for associating a MAP message with each mobile station group;

means for selecting a different modulation coding scheme for each mobile station group; and means for transmitting burst allocation information for each mobile station group in its associated MAP message transmitted using the selected modulation coding scheme.

14. The apparatus of claim 13, wherein the means for associating a MAP message with each mobile station group is configured to associate a SUB-DL-UL-MAP message to each group.

15. The apparatus of claim 13, wherein the means for associating a MAP message with each mobile station group is configured to associate a HARQ-MAP message to each group.

16. The apparatus of claim 13, wherein:
the means for associating a MAP message with each mobile station group is configured to associate a MAP message of a first type to each mobile station group; and
the means for partitioning the mobile stations into a plurality of groups is configured to partition the mobile stations into a fewer number of groups than there are MAP messages of the first type available in an OFDMA frame.

17. The apparatus of claim 13, wherein the means for partitioning the mobile stations into a plurality of mobile station groups is configured to select a combination of sizes that minimizes the resource metric.

18. The apparatus of claim 13, wherein:
the mobile stations support OFDMA communications in accordance with one or more standards of the Institute of Electrical and Electronics Engineers (IEEE) 802.16 family of standards; and
the means for transmitting burst allocation information for each mobile station group is configured to transmit burst allocation in a MAP message transmitted in accordance with one or more standards of the IEEE 802.16 family of standards.

19. A non-transitory computer-readable medium containing a program for transmitting burst allocation information for N mobile stations in a wireless communications system which, when executed by a processor, performs operations comprising:
partitioning the mobile stations into a plurality of mobile station groups, based on reported signal quality values, wherein the reported signal quality values comprise Carrier to Interface Noise Ratio (CINR) values, wherein partitioning the mobile stations into the mobile station groups comprises ranking the mobile stations in order of their CINR value, and wherein partitioning the mobile stations into the mobile station groups further comprises:
selecting multiple combinations of sizes for the mobile station groups;
evaluating each combination of sizes by calculating a resource metric indicative of total resources used to transmit burst allocation information for each mobile station group based on the combination of sizes under evaluation; and
selecting a combination of sizes based on the evaluations;
associating a MAP message with each mobile station group;
selecting a different modulation coding scheme for each mobile station group; and
transmitting burst allocation information for each mobile station group in its associated MAP message transmitted using the selected modulation coding scheme.

20. The non-transitory computer-readable medium of claim 19, wherein associating a MAP message with each mobile station group comprises associating a SUB-DL-UL-MAP message to each group.

21. The non-transitory computer-readable medium of claim 19, wherein associating a MAP message with each mobile station group comprises associating a HARQ-MAP message to each group.

22. The non-transitory computer-readable medium of claim 19, wherein:
associating a MAP message with each mobile station group comprises associating a MAP message of a first type to each mobile station group; and
partitioning the mobile stations into a plurality of groups comprises partitioning the mobile stations into a fewer number of groups than there are MAP messages of the first type available in an OFDMA frame.

23. The non-transitory computer-readable medium of claim 19, wherein selecting a combination of sizes based on the evaluations comprises selecting a combination of sizes that minimizes the resource metric.

24. The non-transitory computer-readable medium of claim 19, wherein:
the mobile stations support OFDMA communications in accordance with one or more standards of the Institute of Electrical and Electronics Engineers (IEEE) 802.16 family of standards; and
transmitting burst allocation information for each mobile station group comprises transmitting burst allocation in a MAP message transmitted in accordance with one or more standards of the IEEE 802.16 family of standards.

* * * * *